US008532623B2

(12) United States Patent  
Black et al.

(10) Patent No.: US 8,532,623 B2
(45) Date of Patent: Sep. 10, 2013

(54) METHODS AND DEVICES FOR AUTOMATIC DISPLAY OF PREPAY INFORMATION

(75) Inventors: Gregory Redmond Black, Vernon Hills, IL (US); Rafael Colorado, Long Grove, IL (US); Kolakaluri Jay Kumar, Gurgaon (IN); Tao Li, Beijing (CN)

(73) Assignee: Motorola Mobility LLC, Libertyville, IL (US)

( * ) Notice: Subject to any disclaimer, the term of this patent is extended or adjusted under 35 U.S.C. 154(b) by 1741 days.

(21) Appl. No.: 11/457,949

(22) Filed: Jul. 17, 2006

(65) Prior Publication Data

US 2008/0039050 A1     Feb. 14, 2008

(51) Int. Cl.
    *H04L 12/58*     (2006.01)
(52) U.S. Cl.
    USPC ............... 455/412.1; 455/412.2; 455/405; 455/406; 455/414.1
(58) Field of Classification Search
    USPC ............ 455/405, 406, 407, 550.1, 558
    See application file for complete search history.

(56) References Cited

U.S. PATENT DOCUMENTS

| 6,430,406 | B1* | 8/2002 | Frisk ........................... 455/407 |
| 2004/0137874 | A1* | 7/2004 | Veerepalli et al. ............ 455/405 |
| 2006/0178166 | A1* | 8/2006 | Luu et al. ..................... 455/558 |
| 2006/0240801 | A1* | 10/2006 | Espejo et al. ................ 455/408 |

OTHER PUBLICATIONS

"Nokia Releases Prepaid Tracker an Easy Way to Keep an Eye on All Costs", http://press.nokia.com/PR/200506/996922_5.html, 2 pages, Jun. 2, 2005.

* cited by examiner

*Primary Examiner* — Kathy Wang-Hurst

(57) ABSTRACT

Described are methods of a mobile communication device for processing a balance information message from a service provider in response to a balance information query. A method includes obtaining a service provider identity from a SIM, determining a format of a balance information message and identifying a balance information message from the service provider according to the format of the balance information message. Also described is a mobile communication device that includes a transceiver, a controller, and a memory configured to store format information including a format of a balance information message. The controller is configured to generate a communication to the service provider for transmission via the wireless transceiver, the communication being based on format information including the format of a balance information query, and to determine whether an incoming message received by the wireless transceiver from the service provider conforms to the balance information message.

21 Claims, 3 Drawing Sheets

METHODS AND DEVICES FOR AUTOMATIC DISPLAY OF PREPAY INFORMATION

FIELD

Disclosed are a mobile communication device, methods of a mobile communication device, and a network of a service provider for automatic display of prepay balance information, and more particularly transmitting a balance query to the server and receiving from the server a balance response, and providing an indication of the balance amount and expiration date to the user of the mobile device.

BACKGROUND

A purchaser of a mobile communication device has many options as to how to pay for air time. One manner in which to pay for time is to sign up for a calling plan. In particular, a purchaser can choose a calling plan with a service provider that gives the user an allotment of minutes per month for a certain price. Any overages are billed to the customer. To purchase such plans, a service provider may run a credit check on the purchaser, or require their possession of a valid credit card and/or require income proof in some markets.

Instead of purchasing a plan, an airtime customer may prefer to purchase a prepaid block of airtime. Accordingly, the customer will have a finite amount of time or calling value in a prepaid block of airtime. Once the prepaid block is consumed, the customer must purchase a new block of airtime.

As the prepaid airtime subscriber uses the communication device during active mode, the balance of remaining available airtime diminishes from the initial prepaid subscription. Unless the user has kept track of the minutes used, and knows the tariff or roaming charges, the user must rely on the service provider to inform him of the remaining balance. To learn the remaining balance of a prepaid subscription, a balance query is typically initiated by the user while the mobile communication device is in idle mode.

Mobile communication devices may each have more than one service provider. The telephone number and characters to input for balance information and the formats of the balance information query and balance information message may be different for each service provider. The service provider's prepay server telephone number may be five digits that must be input on the mobile device's key pad. Additional steps may be required as well. The steps provided to the user are most often written in a user's manual relating to the service provider's services. If the communications device is made for only one service provider then the steps for obtaining balance information may be automated, but prepaid airtime subscribers generally want the flexibility to buy prepaid airtime from different service providers. Furthermore device manufacturers may find it logistically difficult to provide different models for each service provider.

Prepay users may have incentive to change service providers based on promotional offers and other circumstances. For some users, it can be difficult to follow and carry out the steps necessary to learn their remaining balance. Moreover, if a prepaid balance message in response to a query is in a format such as SMS, a user may have difficulty interpreting the message to determine the remaining prepaid balance. It would be beneficial if the user could learn the remaining prepaid balance without manually entering the service provider's balance information telephone number and without following certain other steps. It would also be beneficial if the prepaid balance and a subscription expiration data were presented to a user in an easy to interpret manner. Subscription expiration data may also be referred to as validity information. It would be further beneficial were prepay uses able to view their balance amount and validity/expiration date information in a consistent manner regardless of which service provider they were using at a particular time.

DETAILED DESCRIPTION

Figure 1:
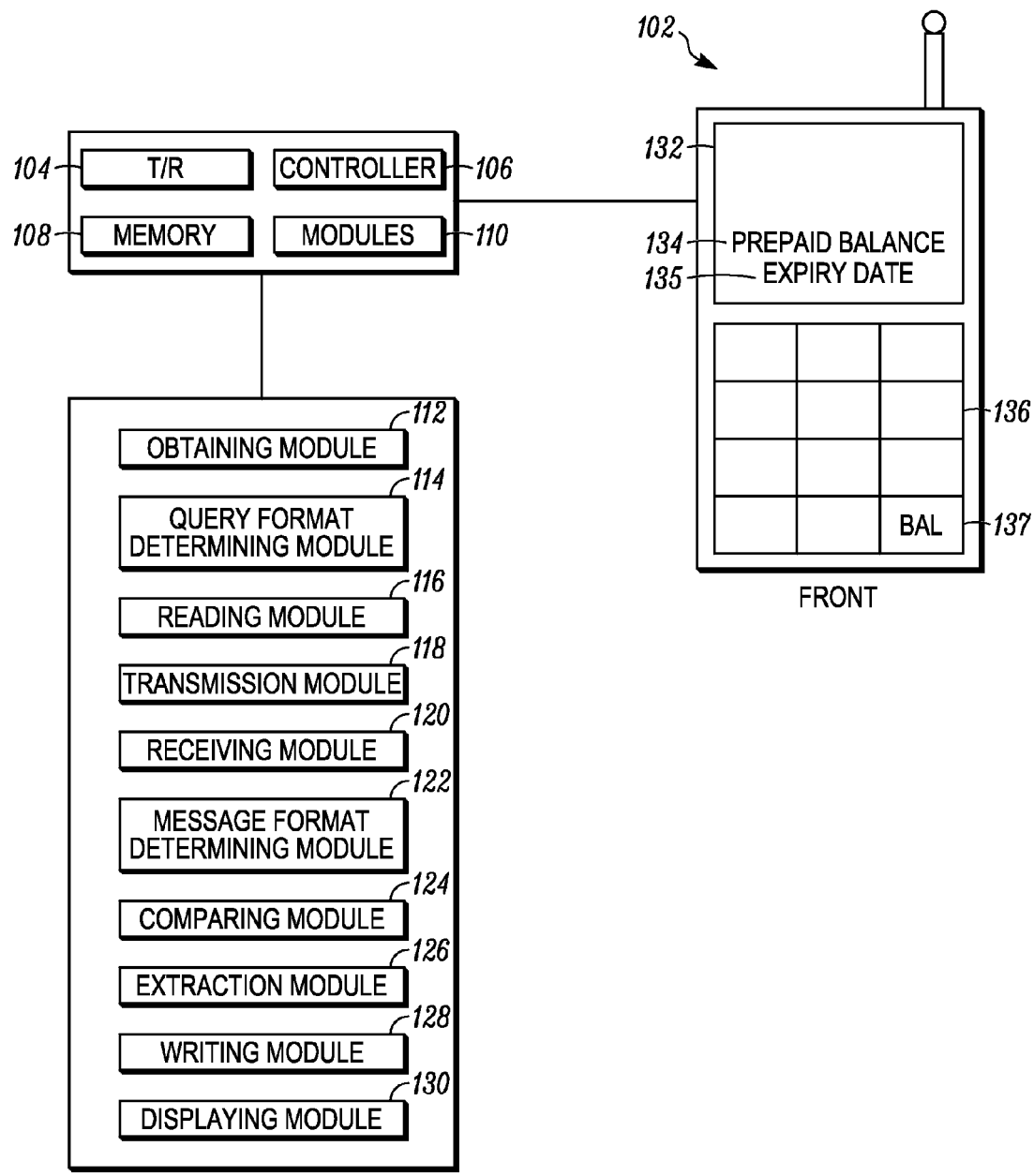
FIG. 1 depicts a mobile communication device for a wireless communication system.

Described are methods of a mobile communication device for processing a balance information message from a service provider in response to a balance information query. In one embodiment a method includes obtaining a service provider identity from a SIM, determining a format of a balance information message particular to the service provider and identifying a balance information message from the service provider according to the format of the balance information message.

In another embodiment, a method includes receiving an incoming message, determining whether the incoming message conforms to a format of a balance information message stored in a memory of the mobile communication device and writing the incoming message to a memory of the mobile communication device if the incoming message conforms to the format of a balance information message.

Also described are mobile communication devices for a wireless communication system. In one embodiment a mobile communication device includes a transceiver and a controller, coupled to the transceiver. The device further includes a memory configured to store format information including a format of a balance information message from a service provider as a response to a balance information query. The controller is configured to generate a communication to the service provider for transmission via the wireless transceiver, the communication being based on format information including the format of a balance information query. The controller is further configured to determine whether an incoming message received by the wireless transceiver from the service provider conforms to the balance information message.

Further described is a wireless communication network of a service provider including a controller and a memory coupled to the controller, the memory being configured to store a balance information message format in which the balance information message format is particular to the service provider. A transceiver is also coupled to the controller, the transceiver being configured to receive a balance information query via a communication channel particular to the service provider. The controller is configured to retrieve the balance information message format and generate a balance information message to transmit via the communication channel.

The instant disclosure is provided to further explain in an enabling fashion the best modes of making and using various embodiments in accordance with the present invention. The disclosure is further offered to enhance an understanding and appreciation for the invention principles and advantages thereof, rather than to limit in any manner the invention. The invention is defined solely by the appended claims including any amendments of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts within the preferred embodiments.

FIG. 1 depicts a mobile communication device 102 for a wireless communication system. The mobile device 102 may be implemented as a cellular telephone (also called a mobile phone). The mobile communication device 102 represents a wide variety of devices that have been developed for use within various networks. Such handheld communication devices include, for example, cellular telephones, messaging devices, personal digital assistants (PDAs), notebook or laptop computers incorporating communication modems, mobile data terminals, application specific gaming devices, video gaming devices incorporating wireless modems, and the like. Any of these portable devices may be referred to as a mobile station or user equipment. Herein, wireless communication technologies may include, for example, voice communication, the capability of transferring digital data, SMS messaging, Internet access, multi-media content access and/ or voice over internet protocol (VoIP) over a plurality of communication channels.

The wireless communication device can include at least one wireless transceiver 104, a controller 106, a memory 108 and modules 110, including for example, an obtaining module 112, a query format determining module 114, reading module 116, a transmission module 118, a receiving module 120, message format determining module 122, a comparing data module 124, an extraction module 126, a writing module 128, and a displaying module 130. The modules can carry out certain processes of the methods as described herein. The modules can be implemented in software, such as in the form of one or more sets of prestored instructions, and/or hardware, which can facilitate the operation of the mobile station or electronic device as discussed below. The modules may be installed at the factory or can be installed after distribution by, for example, a downloading operation. The operations in accordance with the modules will be discussed in more detail below.

The local memory 108 can be configured to store format information including, for example, a format of a balance information query, a validity information query, a balance information message from a service provider to a balance information query, and an expiry date information message and/or a time remaining information message from a service provider. In addition to local memory or as an alternative to local memory 108, a Subscriber Identity Module (SIM) can be configured to store format information as well as applications for extraction of the balance data from messages received in response to queries to the service provider.

Figure 2:
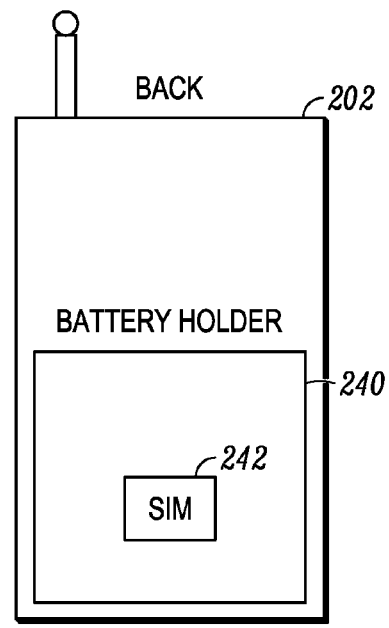
FIG. 2 illustrates a SIM seen from the back side of a mobile communication device.

FIG. 2 illustrates a SIM seen from the back side of a mobile communication device 202. The back side can include a battery holder 240. Often below a battery holder in a mobile communication device 202 is an easily accessed SIM card holder 242. The SIM card typically holds identification information for user validation and authentication purposes, for example including a service provider's identification, but may also provide memory for additional data storage. In addition to local memory or as an alternative to local memory 108, a SIM can be configured to store format information including a format of a balance information message from a service provider to a balance information query. It is understood that a SIM may be in any type of configuration, and can be made accessible in any suitable manner. It is further understood that there may be additional memory provided that is not a SIM, but accessible and/or removable from the device in a similar manner to that of a SIM. It is understood that by the term SIM, any additional memory card is within the scope of this discussion.

Figure 3:
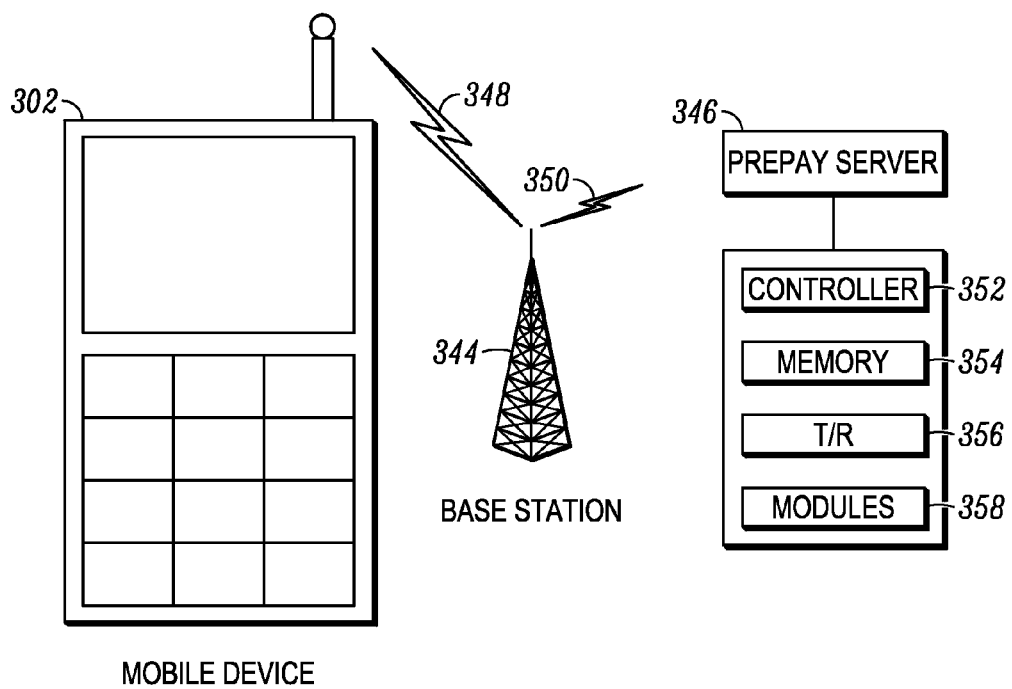
FIG. 3 depicts an overall system view including a mobile communication device, a base station and a prepay server.

FIG. 3 depicts an overall system view including a mobile communication device 302, a base station 344 and a prepay server 346. The mobile communication device 302 can be in communication 348 and 350 with a prepay server 346 via a base station 344. While FIG. 3 depicts a typical network arrangement, it is understood that any type of network is within the scope of this discussion. The mobile communication device 302 may be, for example, in communication in a WIFI network, an ad hoc network or via mobile-to-mobile.

The server 346 is depicted as a remote server within a wireless communication network 344. The network 346 of course may be any type of wireless network including an ad hoc or wireless personal area network, a WiFi or wireless local area network, and a cellular, wireless wide area network and mobile-to-mobile. Likewise, the server 346 may be of any suitable configuration. The server 346 may be implemented as a single server or as a plurality of servers in communication in any arrangement. The operations of the server 346 may be distributed among different servers or devices that may communicate in any manner. It is understood that the depiction in FIG. 3 is for illustrative purposes.

The prepay server 346 may be affiliated with a service provider or otherwise. The term "prepay server" can mean any entity that can receive from a mobile communication device 302, directly or indirectly, a balance information query sent while the mobile communication device is engaged in active mode wireless communication or inactive mode. Moreover, the entity, affiliated entity or otherwise can respond to the balance information query of the mobile communication device by transmitting a response including a balance information message that is substantially current when the response is transmitted.

The prepay server or wireless communication network of a service provider may include a controller 352, a memory 354 coupled to the controller 352 where the memory can be configured to store a balance information message format. The balance information message format can be particular to the service provider.

A transceiver 356 can be coupled to the controller 352. The transceiver 352 can be configured to receive a balance information query directly or indirectly from a mobile communication device. The controller can be configured to retrieve the balance information message format, process the request, and generate a balance information message to transmit. The service provider may receive a balance information query via a communication channel particular to the service provider and can transmit a balance information message via the communication channel particular to the service provider or via another channel. If the mobile communication device 302 is in active wireless communication mode, the query and message in response can be sent on a channel different from the channel of the active mode. In active mode, the channel for voice communication of preference may be GSM. The query and message in response to the query may be sent on another channel such as USSD, SMS, IVR and Internet which can be different from the voice communication channel. If the communication is data communications such as downloads and Internet communication, then a different channel or set of channels may be required for the balance information query and message in response. It is understood that the channel for the query and the message in response to the query may be information stored in the memory 354 of the prepay server and in the memory of the device either or both the memory 108 (see FIG. 1) and the SIM 242 (see FIG. 2).

Returning to FIG. 1, the mobile communication device 102 can further include a display device 132 that can display balance information, both of a prepaid amount 134 and an expiry date 135 together or separately, and any other suitable information. The announcement or annunciation of display balance and/or one or more expiry dates may be provided in any manner, such as by an audio (and/or visual) signal. As will be discussed in detail below, the display of the balance information and/or the expiry date can be on a dedicated portion of the display screen. For example, indicia may be displayed in an always-on manner, that is, while the device is in active and inactive mode. Moreover, since the data can be extracted from a recognized format of a balance information message sent in response to a query from the device, it can be represented in a consistent manner from many or all service providers. One or more service providers may operate in a plurality of regions or areas, each may have a particular format for their balance information messages. Therefore, the process of extraction of the data when an incoming message conforms to the format of a balance information method can provide for a consistent display of the data on a display device regardless of the service provider's format.

Still referring to FIG. 1, the controller 106 can be coupled to the transceiver 104 and the memory 108, and can be configured to generate a communication which may be a balance information query to the service provider, and can receive an incoming message from the service provider. The communication may be automatically generated or manually generated. Automatic generation may be, for example, periodic or random. The frequency of queries may depend upon the rate at which the prepaid balance is decreasing. The controller may monitor the prepaid balance and compare successive balances to determine if there is a fast decrease in the balance which may reflect a high tariff. Tariffs may differ, for example, depending upon the time of day of a communication and/or roaming charges. User preferences may provide user options for the frequency of queries. It may be that there is a charge for query responses, and the user may wish to limit the queries to a certain number per day, or a frequency such as once every five minutes during a communication. A service provider may also have prepaid plans where rental and administration fees are decremented on a daily or otherwise basis. Therefore, even if a user does not use his device for communication every day, the prepaid balance may be reduced. Accordingly, the application for a query and message may be activated, for example, every twelve hours, to update the balance even in idle mode.

In one embodiment, the balance information is displayed continuously on the display. The queries and responses may occur in rapid succession to maintain current balance on the display. In the alternative, one or more applications running on the device may extrapolate the current balance between incoming messages based on previous balances, tariffs and time elapsed. In some networks the balance information is automatically sent without there having been a query. In these situations automatic queries may be cancelled in order to eliminate unnecessary network traffic. It is understood that the frequency and conditions under at which automatic queries are made may depend on many variables and circumstances.

For manual transmission of a query, the wireless transceiver 104 that may receive user input via the keypad 136 or any other input mechanism. The device 102 can also include a keypad 136 having a dedicated query input key 137 of the key pad for inputting a signal to the controller 106 to generate and transmit the balance information query to the service provider (346, see FIG. 3). Manual transmission of a query may be during active or inactive mode.

As mentioned above, the local memory 108 and/or the SIM 242 (see FIG. 2) can be configured to store format information including, for example, a format of a balance information query, a validity information query, and a balance information message from a service provider as a response to a balance information query. For the device 102 to generate a balance information query, the service provider identification and the format of the balance information query can be accessed from memory 108 and/or 242 by the controller 106. The service provider may provide both the balance information and expiry date information together in the balance information message in response to the balance information query. On the other hand, a query for the balance information and a query for the expiry date information, such also being a form of a balance information query, can be made separately and responded to separately by the prepaid server and/or other entity.

The format of the balance information query can include the service provider identification. A service provider may operate in a plurality of regions and therefore the region or the area of a wireless communication may also be included with the format data. The requirements of the service provider may differ from region to region and area to area. A prepay service may be operated by an entity different from the service provider so requirements for query and message formats may be particular to the region or area.

In addition to the service provider identification, a channel type particular to the service provider as described above may be provided with the format data. The service provider contact information may include data such as the numbers and/or characters transmitted to contact the prepay server, and any other query data. As mentioned above, the channel for query and message communication may be dependent upon whether the device is in active or inactive mode, and if in active mode, the type of communication during active mode, such as voice, data and Internet.

The format of the balance information message can be an expected response from the service provider. The expected response can be compared against an incoming message received from the service provider via a channel particular to the service provider. If the incoming message conforms to the expected response, balance information and/or expiry data information may be extracted from the balance information response. As discussed above, the format of the balance information message can provide service provider identification. It may also include a balance field identifier, such as a currency symbol. The format may also include an expiry date format provided in any of the many manners in which to write a date. The format may also include unique identifier such as "$$" at beginning of balance information message and additionally or optionally, the format may also include numeric information field location such as that the first numeric information is the remaining prepaid balance and such as that the second numeric information is the expiry date. The format of the balance information message may include a unique identifier of the message and/or the sentence comprising the balance amount and expiration date information.

The service provider identification, the formats for the balance information query and the balance information message, the channel type and any other pertinent information may be stored in a data table. The query and message data may be stored in memory of the device for users from two or more countries, regions or areas. The mobile communication device may also store information including the data table, data relating to the service providers, their service provider identifications, their different currencies, their different date formats, their different communication channels, and data relating to their different written and spoken languages. However, if the service provider information, the formats for the balance information query and the balance information message, the channel type or any other pertinent information is stored in the SIM then there may be no need for a table of formats.

Figure 4:
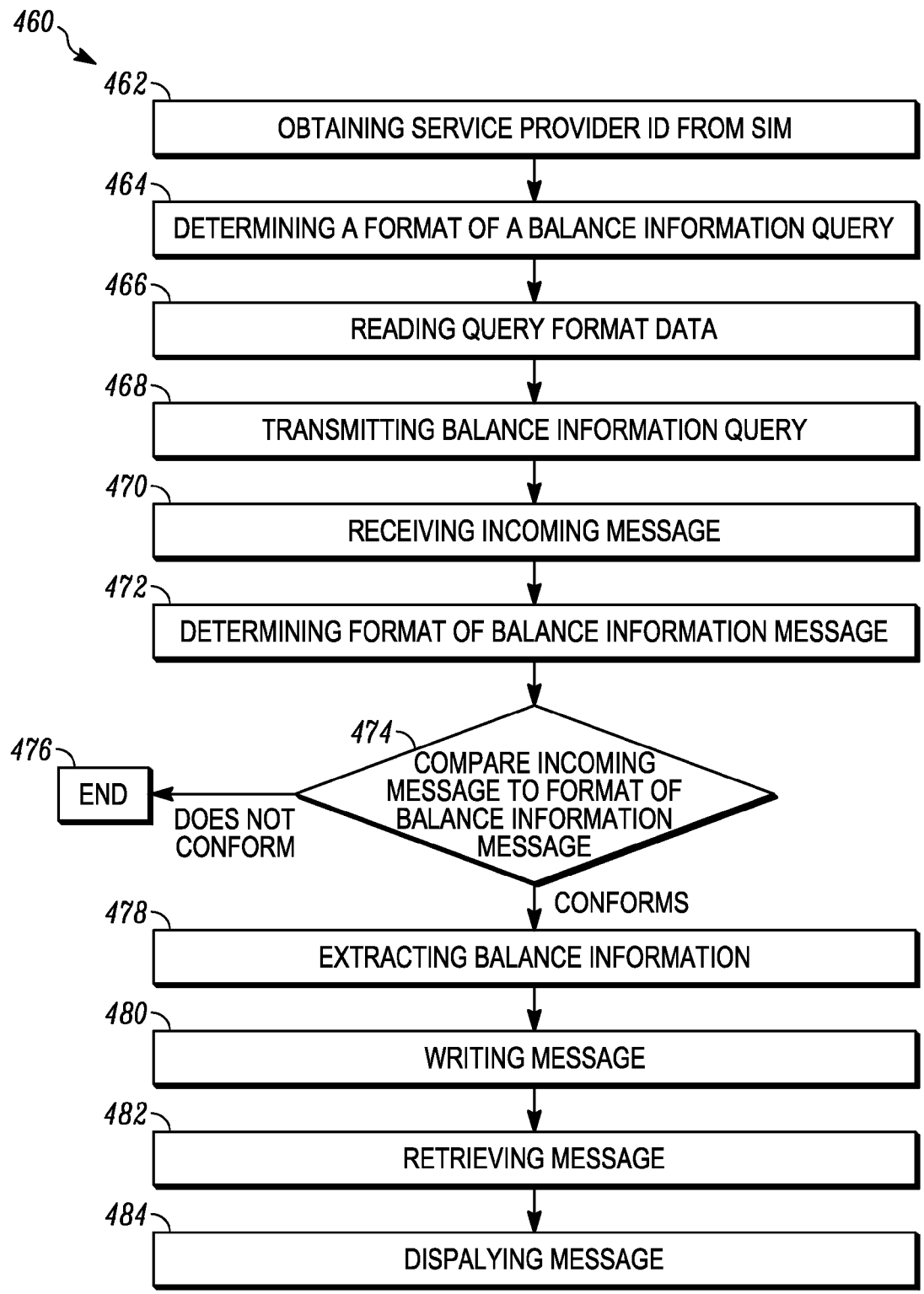
FIG. 4 is a flow chart illustrating an embodiment of a method as described herein.

FIG. 4 is a flow chart illustrating an embodiment of a method 460 as described herein. As mentioned above, a balance information query may be generated and transmitted in active or inactive mode. The channel chosen for the transmission may depend upon the mode of the device. To generate a balance information query, the device can optionally obtain a service provider identity from a SIM 462. An obtaining module 112 (see FIG. 1) of the device 102 can be configured, for example, to obtain the service provider identity from a SIM. In one embodiment, the format data of the query and the message in response to the query may be accessible in idle mode. In this manner an always-on display can be updated. In another embodiment, the format data can be stored in, for example, a cache and accessed and used during active mode so that the display can be updated during communication.

A format of a balance information query particular to the service provider may be determined 464 by reading a query format stored in local memory 108, the SIM 242 or another data storage device. The query format determining module 114 can be configured to form a determined balance information query format based upon the reading module 116 reading the format data from a data table that is either stored in the SIM or local memory during manufacture and/or distribution, or downloaded at any time before or after distribution of the device and/or the SIM.

Reading format data for a balance information query from any of the memory units of the device may be provided by the reading module 116. Additionally, the reading module 116 can be configured to read the data of any of the memory units of the device in determining the format of the balance information message that can be provided in response to the balance information query.

Upon determining the balance information query, a query can be transmitted to the service provider according to the determined balance information query format 468. The transmission module 118 can access the channel for transmission as described above. The receiving module 120 can be configured to receive an incoming message 470. The incoming message may be a response by the service provider to the balance information query.

The format of the balance information message can be a determined or expected format. The data stored regarding the format may be provided by the service provider to the manufacturers or distributors of the device 102 or the SIM 242. As discussed above, the data stored in local memory and/or the SIM relating to the format of a balance information message can be accessed by the controller 106 of the device 102 to determine the format of the balance information message 472. It is understood, that instead of or in addition to accessing a data table, any process for determining a format of a balance information message particular to the service provider is within the scope of this discussion.

A message format determining module 122 (see FIG. 1) of the device 102 can be configured, for example, to determine a format of a balance information message form data stored in the SIM 242 and/or local memory 108, or to determine a format of a balance information message in another manner. For example, the service provider may download the format for the balance information message in a preceding or the same message. The entire or a portion of the format of the balance information message can be sent by the service provider in response to the query as a header and then stored in a cache for example, so it also can be used in an extraction application. The data may be stored in short term memory such as a cache and then may be written to a data table stored in long term memory. In the alternative, the service provider may fashion the format based on the information balance query in a manner that requires less or no access to data stored in a memory of the device for the format of the balance information message. The device can therefore identify a balance information message from the service provider according to the determined or expected format of the balance information message.

Upon determining the format of the balance information message, the device 102 can compare the incoming message with the determined format of the balance information message 474. A comparing module 124 can be configured to determine whether the incoming message conforms to the determined format of the balance information message. If it is found that there is no conformity, the process may end 476. If it found that there is conformity to any suitable degree, the extraction module 126 can extract balance information from the balance information message according to the format of the balance information message to form extracted balance information 478. The balance information can include a remaining prepaid balance and/or can include an expiry date. As mentioned above, the remaining prepaid balance and the expiry data may be combined in a balance information message, or they may be delivered separately and they may be queried separately as well. Expiry date data may be requested and extracted from the response in the same, similar or different formats to that of a prepaid balance query.

Depending upon the service provider, the format of the message either may need interpretation by an application of the device or of the SIM, or may be provided in a format that may be directly displayed. In one embodiment, upon determining whether the incoming message substantially conforms to a format of a balance information message stored in a memory of the mobile communication device, the balance of the information balance message can be extracted and displayed on a display or otherwise annunciated by the device. In another embodiment, an incoming message can be written 480 to a memory of the mobile communication device if a part or the entire incoming message conforms to the format of a balance information message 478. Writing the incoming message to a memory of the mobile communication device can include writing the incoming message to an SMS file of a SIM 242 (see FIG. 2) of the mobile communication device. A SIM application or SIM Tool Kit (STK) functionality may convert the message to a form that can be displayed on the display device 132 (see FIG. 1). After the SMS file is retrieved by a SIM application 482, a part of the message or the entire message can be displayed on the display device 484. In this manner, the most pertinent information such as the remaining balance information and/or the expiry date can be displayed in an easy to understand display format on, for example, a dedicated display screen or portion of a display screen 132 (FIG. 1). A SIM application, STK or other application can be updated by downloading new data from a service provider to the device or SIM as updates are available. Alternatively, certain portions of a message string may be downloaded and/or overwritten. The frequency of downloads can depend upon the service provider. For example, the service provider may transmit downloads during the device and network hand shaking process when the device is powered up. Application updates or downloads may include new balance query and response formats.

As mentioned, the format of the message may also include numeric information field location such as that the first numeric information is the remaining prepaid balance and such as that the second numeric information is the expiry date. Additionally, different criteria for determining a balance information message format may be processed. For example, to determine if a message is conforming to a determined balance information message, the application may analyze the incoming message for a currency symbol immediately preceding or succeeding a numeric character. The extraction application may also process a message as a balance information message if a currency symbol is the first word of the message or the first word of a string. In another embodiment, the phrase "balance is" may precede a currency symbol and a numeric symbol. In another embodiment, the word "balance" may precede a currency symbol and a numeric symbol. In yet another embodiment, "is" may precede a currency symbol preceding a numeric character. In another embodiment the balance information message may begin with a unique identifier such as $$ followed by sentence comprising first numeric data corresponding to prepaid balance amount and second numeric information in any of the date formats corresponding to the expiration date. Moreover, a handset application and/or SIM application (STK) may process different variations for currency symbols, misspellings and colloquial terminology.

As with the prepaid balance message format, an incoming message that may be expiry date message may be similarly analyzed to determine if it conforms to an expected expiry date message format. As mentioned, the format of the message may also include numeric information field location such as that the first numeric information is the remaining prepaid balance and such as that the second numeric information is the expiry date. If the validity query number is unique and a date is the first item in the response message, then the data may be an expiry date and can therefore be extracted and displayed. Alternatively, the message may include one or more numeric characters preceded or succeeded by words, for example expiry, expiration, validity, valid till, and valid until, the value for the expiry date may be extracted by the SIM or STK application, or other application of the device. While formats for balance information queries and messages may be accessed from one or more memories of a device, other information may be accessed as well.

Certain service provides may automatically transmit a new balance after a communication. Such a feature may be activated or not during the SIM personalization, depending upon the user's or service provider's needs. Under such circumstances, the application may de-activate, in whole or in part, its automatic query application if the service provider automatically transmits balance information messages. Depending upon the circumstances, the SIM may have no role in managing display of automatic messages sent by service provider on handset. The automatic transmission can be by the network and handset can display the incoming message if handset is configured to display the message. Moreover, the query process can be managed by the handset and the same intelligence at which junctures to query the service provider network or not can be built into the handset.

As briefly mentioned above, the formats of the query and message may be stored in memory upon manufacture of the device or distribution of the device and/or the SIM. Alternatively, the formats may be provided by the service provider at a different time. For example, the service provider may transmit and the device may download the formats to memory initially or at a later time. The controller 106 (see FIG. 1) of the device can be also configured to overwrite format information that is stored in the memory based on the data downloaded from the service provider. For example, the service provider may update the format initially provided to the device. In that event, the device can download a revised format for a query or a message in response to a query.

For prepay customers there may be incentive to change service providers based on promotional offers and other circumstances. In that event, having available and/or accessible query and message format data for a plurality of service providers in a particular region or area, and an application for extracting their balance information messages in response to queries in a consistent manner may be beneficial to the user of the device. As discussed in detail above, when the device receives a message in response to the query and extracts the balance information and/or expiry date based on the format data, the pertinent information can be display or otherwise annunciated in a consistent manner, regardless of which service provider the user may use at a particular time. In this manner, a user need not follow difficult to understand steps specific to a service provider that would be necessary to learn their remaining balance.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitable entitled.

The invention claimed is:

1. A method of a mobile communication device, the method comprising:
   obtaining a service provider identity from a SIM;
   generate a balance information query to the service provider using the obtained service provider identity from the SIM;

determining a format of the balance information query particular to the service provider from a plurality of supported formats;

generate a communication to the service provider for transmission via a wireless transceiver, based on format information and including the balance information query, wherein the format information includes channel information for transmission of the communication to the service provider;

receiving an incoming balance information message from the service provider;

identifying the incoming balance information message from the service provider according to the format of the balance information message;

determining whether the incoming balance information message conforms to the format of the balance information query, among the plurality of supported formats, stored in a memory of the mobile communication device; and writing at least a balance information of the incoming balance information message to a memory of the mobile communication device if the incoming message conforms to the format of the balance information query.

2. The method of claim 1, wherein the balance information message comprises an account balance.

3. The method of claim 1, wherein the balance information message comprises an account expiry date.

4. The method of claim 1, wherein the format of the balance information message comprises a balance field identifier.

5. The method of claim 1, wherein the format of the balance information message includes a unique identifier of the balance information message.

6. The method of claim 1, wherein the format of the balance information message comprises a numeric information field location.

7. The method of claim 1, comprising:
determining a format of a balance information query particular to the service provider to form a determined balance information query format; and
transmitting a balance information query to the service provider according to the determined balance information query format.

8. The method of claim 7, the format of the balance information query comprises a channel type.

9. The method of claim 7, wherein determining the format of the balance information query or the format of the balance information message comprises:
reading format data from a data table stored in the mobile communication device separate from the SIM, the data table containing format information.

10. The method of claim 7, wherein determining the format of the balance information query or the format of the balance information message comprises:
reading format data from the SIM.

11. The method of claim 1, comprising:
receiving a balance information message;
extracting balance information from the balance information message according to the format of the balance information message to form extracted balance information; and
displaying the extracted balance information.

12. The method of claim 1, wherein writing the incoming message to memory comprises:
writing the incoming message to an SMS file of a SIM of the mobile communication device or storing the incoming message in a handset memory location.

13. The method of claim 12, wherein the balance information message comprises balance information, the method further comprising:
retrieving the SMS file by a handset application; and
displaying balance information on a display device.

14. A mobile communication device for a wireless communication system, comprising:
an obtaining module configured to obtain a service provider identity from a SIM;
a processor configured to generate a balance information query to the service provider using the obtained service provider identity from the SIM;
a query format determining module configured to determine a format of the balance information query particular to the service provider from a plurality of supported formats;
a wireless transceiver;
a memory configured to store format information including a format of a balance information message, among a plurality of supported formats, from a service provider to the balance information query; and
a controller, coupled to the transceiver and the memory, configured to generate a communication to the service provider for transmission via the wireless transceiver, the communication being based on format information and including the balance information query, wherein the format information includes channel information for transmission to the service provider, the controller configured to determine whether an incoming message received by the wireless transceiver from the service provider conforms to the format of the balance information message and to write at least a balance information of the incoming message to the memory of the mobile communication device if the incoming message conforms to the format of the balance information message.

15. The device of claim 14, wherein the controller is further configured to determine that the incoming message is received from an intended service provider source and not from another user source in a network of the service provider.

16. The device of claim 14, wherein the memory is further configured to store format information including channel information for transmission of a balance information query to a service provider.

17. The device of claim 14, wherein the memory comprises:
a SIM.

18. The device of claim 14, wherein the memory comprises:
local memory of the mobile communication device.

19. The device of claim 14, wherein the transceiver is configured to receive a communication containing data from a service provider and the controller is configured to overwrite format information that is stored in the memory based on the data from the service provider.

20. The device of claim 14, wherein the controller is configured to generate and transmit the balance information query to the service provider during active mode of the device.

21. The device of claim 14, further comprising:
a key pad;
a query input key of the key pad for inputting a signal to the controller to generate and transmit the balance information query to the service provider.

* * * * *